United States Patent [19]

Poll et al.

[11] Patent Number: 5,194,576

[45] Date of Patent: Mar. 16, 1993

[54] MELT PRODUCTION OF A THERMOPLASTICALLY PROCESSIBLE AROMATIC POLYAMIDE WITH PHOSPHORUS COMPOUND CATALYST AND METAL SALT CATALYST

[75] Inventors: Günter Poll; Jürgen Finke, both of Marl; Horst Heuer, Haltern, all of Fed. Rep. of Germany

[73] Assignee: Huels Aktiengesellschaft, Marl, Fed. Rep. of Germany

[21] Appl. No.: 828,619

[22] Filed: Jan. 31, 1992

[30] Foreign Application Priority Data

Feb. 2, 1991 [DE] Fed. Rep. of Germany ....... 4103210

[51] Int. Cl.$^5$ .............................................. C08G 69/28
[52] U.S. Cl. .................................. 528/336; 528/125; 528/126; 528/179; 528/180; 528/183; 528/223; 528/225; 528/229; 528/337; 528/348

[58] Field of Search ............... 528/336, 337, 348, 125, 528/126, 179, 180, 183, 223, 225, 229

[56] References Cited

U.S. PATENT DOCUMENTS

| | | | |
|---|---|---|---|
| 4,720,538 | 1/1988 | Bartmann | 528/336 |
| 4,727,130 | 2/1988 | Bartmann | 528/336 |
| 4,749,768 | 6/1988 | Finke et al. | 528/336 |

Primary Examiner—Harold D. Anderson
Attorney, Agent, or Firm—Millen, White, Zelano and Branigan

[57] ABSTRACT

Aromatic polyamides with an improved stability toward thermal oxidation was achieved by polycondensation being performed in the presence of 0.05 to 4 mol % of a catalyst comprising a mixture of phosphorus compounds and metal salts.

With the process according to the invention, it is possible to obtain aromatic polyamides stable toward thermal oxidation.

11 Claims, No Drawings

MELT PRODUCTION OF A THERMOPLASTICALLY PROCESSIBLE AROMATIC POLYAMIDE WITH PHOSPHORUS COMPOUND CATALYST AND METAL SALT CATALYST

SUMMARY OF THE INVENTION

An object of the invention is a process for the production of a thermoplastically processible aromatic polyamide by polycondensation of the following starting monomers:

A. HOOC—Ar—COOH
B. $H_2N$—Ar'—$NH_2$ in this case there is meant by:

Ar: 1,3 or 1,4-phenylene; 1,4-, 1,5-, 2,6- or 2,7-naphthylene, or

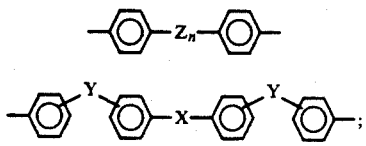

Ar':

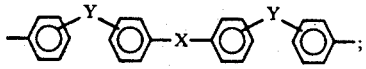

X: —$SO_2$—; —CO—;
Y: —O—; —S—;
Z: —O—; —S—; —$SO_2$—; —CO—; —$CR_2$—;
R: —H; $C_1$–$C_4$-Alkyl;
n: 0; 1;

in the polyamide melt in the presence of a catalyst at temperatures in the range of 200° to 400° C.

The production of such polyamides is basically known (DE-OS 36 09 011). But the melt viscosity of these aromatic polyamides is considerable. Therefore, very high temperatures are necessary in their production and processing—generally at least 350° C. At these temperatures often a damaging of the product is observed, recognizable by discolorations or a deterioration of the mechanical properties.

Another object of the invention is to make available aromatic polyamides, which do not exhibit the described drawbacks of the product of the prior art.

Upon further study of the specification and appended claims, further objects and advantages of this invention will become apparent to those skilled in the art.

These objects are achieved in that the reaction takes place in the presence of phosphorus compounds and metal salts, except for tin(II) salts, as a catalyst. The content of phosphorus compounds and metal salts is 0.05 to 4 mol % relative to the sum of components A and B, and the phosphorus compounds are used at least in an amount of 0.025 mol % and the metal salts in an amount of at least 0.025 mol %, each relative to the sum of components A and B.

As phosphorus compounds, acids of the general formula $H_3PO_m$ with m=2 to 4 as well as their derivatives are suitable. Suitable phosphorous compounds for use in accordance with the present invention are disclosed in U.S. Pat. No. 4,749,768 and DE 3,609,011, which are hereby incorporated by reference. Production of such phosphorous compounds is known. Phosphoric acid, phosphorous acid, hypophosphorous acid, phosphonic acids, e.g., methane phosphonic acid, phenyl phosphonic acid; phosphonous acids, e.g., benzene phosphonous acid; phosphinic acid, e.g., diphenylphosphinic can be mentioned.

Suitable metals of the 1st to 3rd main groups (Groups IA, IIA, and IIIA) of the periodic table are, e.g., lithium, sodium, potassium; magnesium, calcium, barium, aluminum. Further, the metals zinc and iron are also suitable.

Anions that can be used for salt formation are, e.g., chloride, acetate, stearate or anions that can be formed from the above-mentioned phosphorus compounds according to the invention.

Preferably those metal salts are used that are soluble in the reaction mixture.

The catalyst of phosphorus compound and metal salt is preferably contained in an amount of 0.05 to 4 mol %, preferably 0.2 to 2 mol % relative to components A and B in the reaction mixture. The molar ratio of phosphorus compound to metal salt is not critical, so long as the amount of the phosphorus compound is at least 0.02 mol % and the metal salt is at least 0.025 mol % in each case relative to the sum of components A. and B in the reaction mixture.

Isophthalic acid, terephthalic acid, 1,4-, 1,5-, 2,6-, 2,7-naphthalene dicarboxylic acid, 4,4'-diphenyl ether dicarboxylic acid or 4,4'-benzophenone dicarboxylic acid, 4,4'-diphenylsulfone dicarboxylic acid, 2-phenoxyterephthalic acid, 4,4'-biphenyl dicarboxylic acid or their mixtures are suitable as aromatic dicarboxylic acids (component A).

Preferably isophthalic acid alone or a mixture of isophthalic acid with another of the above-named acids is used. In such mixtures, up to 45 mol% of isophthalic acid is preferred.

For example, 4,4-Bis(4-aminophenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)benzophenone, 4,4'-bis(p-aminophenylmercapto)diphenylsulfone or their mixtures are suitable as aromatic diamines (component B).

Preferably 4,4-bis(4-aminophenoxy)diphenylsulfone is used.

The molar ratio of components A and B in the range of about 1:1, but one of ordinary skill in the art could clearly determine operable proportions with only routine experimentation.

The glass temperature ($T_g$) of the aromatic polyamides is in the range of 190° to 270° C., the viscosity numbers (J values) at about 30 to 180 $cm^3/g$; preferably at 60 to 155 $cm^3/g$.

To achieve an improved hydrolytic stability of the polyamides, 0.01 to 10 mol %, relative to the sum of components A and B of a lower molecular aliphatic, aralaliphatic or aromatic alkyl carboxylic acid amide, each preferably $C_1$–$C_{20}$, can be added to the aromatic polyamides. In this case, the aromatic radical can be substituted by halogen or by $C_1$ to $C_4$ alkyl radicals. This additive is described in DE-OS 38 04 401.

The hydrolytic stability can also be improved by component A being used in slight excess (DE-OS 39 35 467) or, if A and B are present approximately equimolar, a monocarboxylic acid is additionally added (DE-OS 39 35 468).

The production of the aromatic polyamides is basically known. It is described, e.g., in DE-OS 36 09 011.

A preferred mode of operation in the production of aromatic polyamides is the use of dialkylaminopyridines as a cocatalyst in addition to the inventive catalyst mixture.

Especially suitable dialkylaminopyridines are those with 1 to 10 C atoms in the alkyl group. Preferably used are 4-dimethylaminopyridine, 4-dibutylaminopyridine, 4-piperidinylpyridine, which optionally can form a pyrrolidine ring or piperidine ring together with the amino nitrogen.

If a cocatalyst is used, it is used in an amount of 0.05 to 4 mol %, preferably 0.2 to 2 mol % relative to the sum of components A and B. In especially preferred cases, the cocatalyst is added in an equivalent amount to the catalyst mixture in the reaction mixture.

The reaction is performed in the melt at temperatures in the range of 200° to 400° C., preferably from 230° to 360° C.

Usually the operation is performed under an inert gas at standard pressure. But the operation can also be performed at excess pressure or partial vacuum.

To increase the molecular weight the aromatic polyamides can be subjected to a solid phase postcondensation in an inert gas atmosphere.

The polyamides can be processed to molding compounds on usual machines by injection molding or by extrusion.

The molding compounds additionally can contain fillers, such as talc, or reinforcing agents such as glass fibers, ARAMID ® fibers or carbon fibers, as well as other usual additives such as, e.g., pigments or stabilizers.

The molding compounds are processed according to usual processes, such as injection molding, extrusion or the like, molded parts, fibers, sheets, etc. Also the use of a liquid dispersion or a solution as coating agent starting from the powder (e.g., a fluidized bed process) is possible.

Aromatic polyamides produced according to the process of the invention exhibit an unexpectedly high temperature stability. Processing of the products can take place even at temperatures higher than 340° C. without reduction of the molecular weight or a brown discoloration occurring. Further, the molding compounds obtained according to the invention show an outstanding stability toward thermal oxidation so that they can be used at clearly higher temperatures than corresponding compounds of the prior art. To these properties is to be added a good heat stability, i.e., molding compounds, which are based on aromatic polyamides according to the invention, can be exposed to high temperatures over long periods without a clear loss in mechanical properties occurring.

The parameters mentioned in the description and in the examples were determined with the following processes.

The glass transition temperature ($T_g$) was determined by TLC at a heating rate of 10° C./min.

The viscosity numbers (J numbers) were determined on 0.5 % by weight of solutions of polyamides in a phenol/o-dichlorobenzene mixture (1 : 1 parts by weight) at 25° C. according to DIN 53 728. The heat aging of the specimens was performed at 200° C. in a circulating air oven with 10% fresh air feed.

The examples identified by letters are not according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, cited above and below, and of corresponding applications including German Application P 41 03 210.1, filed Feb. 2, 1991, are hereby incorporated by reference. de

EXAMPLES

Example 1

21.62 g (0.05 mol) of 4,4'-bis(4-aminophenoxy)diphenylsulfone, 8.31 g (0.05 mol) of isophthalic acid with 109 microliters (0.001 mol) of hypophosphorous acid and 158 mg (0.001 mol) of calcium acetate were melted in a polycondensation reactor with stirrer, passing of nitrogen and distillation bridge at 250° C. The temperature was raised to 300° C. after 20 minutes. Thus, the viscosity constantly increased, while the water released during the reaction was distilled off. The reaction was interrupted after 30 minutes at 300° C. The viscosity number (J) was 36 cm$^3$/g. A solid phase postcondensation at 250° C. and 0.5 mbar yielded a polyamide with J=151 cm$^3$/g after 24 hours.

Example A 21.62 g (0.05 mol) of 4,4'-bis(4-aminophenoxy)diphenylsulfone and 8.31 g (0.05 mol) of isophthalic acid were reacted with 109 microliters (0.001 mol) of 50% aqueous hypophosphorous acid and 122 mg (0.001 mol) of 4-dimethylaminopyridine analogously to example 1. The viscosity number (J) of the polyamide was 35 cm$^3$/g. The solid phase postcondensation analogously to example 1 yielded a polyamide with J=75 cm$^3$/g.

Examples 2–9

Examples 2–9 were performed analogously to example 1 but the catalysts were varied according to the table below.

Heat aging

The polyamides produced in examples 1 to 9 and A were pressed at 310° C. and a pressure of 100 bars into plates 1 mm thick and aged in a circulating air oven for 24 hours. The polyamide, produced according to DE-OS 36 09 011 in the comparison example, was discolored dark brown, while the polyamides, produced according to examples 1 to 9, exhibited practically no changes.

TABLE

| Example | Catalyst | [Mol-%] | | [Mol-%] | Cocatalyst | [Mol-%] | J [cm$^3$/g] | J***) [cm$^3$/g] |
|---|---|---|---|---|---|---|---|---|
| 2 | PPS*) | 2.0 | Calcium | 2.0 | DMAP**) | 2.0 | 34 | 84 |

TABLE-continued

| Example | Catalyst | [Mol-%] | | [Mol-%] | Cocatalyst | [Mol-%] | J [cm³/g] | J***) [cm³/g] |
|---|---|---|---|---|---|---|---|---|
| 3 | H₃PO₂ | 1.0 | Sodium acetate | 1.0 | — | — | 28 | 68 |
| 4 | PPS | 2.0 | Bas. aluminum, acetate | 2.0 | — | — | 28 | 118 |
| 5 | H₃PO₃ | 2.0 | Barium acetate | 2.0 | — | — | 34 | 138 |
| 6 | PPS | 1.0 | Lithium acetate | 1.0 | DMAP | 1.0 | 31 | 88 |
| 7 | H₃PO₃ | 0.2 | Zinc acetate | 0.2 | DMAP | 0.2 | 25 | 92 |
| 8 | PPS | 2.0 | Magnesium acetate | 2.0 | — | — | 28 | 60 |
| 9 | H₃PO₃ | 1.0 | Zinc chloride | 1.0 | — | — | 32 | 61 |

*)PSS: phenylphosphonic acid
**)DMAP: 4-dimethylaminopyridine
***)after solid phase postcondensation The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a thermoplastically processible aromatic polyamide comprising melt polycondensing the following starting monomers:
   (A) HOOC—Ar—COOH
   (B) H₂N—Ar'—NH₂
wherein:
Ar is 1,3 or 1,4-phenylene; 1,4-, 1,5-, 2,6- or 2,7-naphthalene,

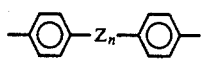

or

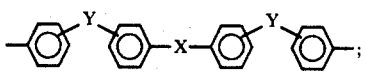

Ar':

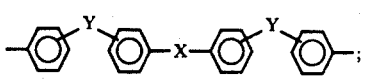

X: —SO₂—; —CO—;
Y: —O—; —S—;
Z: —O—; —S—; —SO₂—; —CO—; —CR₂—;
R: —H; C₁-C₄-Alkyl;
n: 0; 1;
in the presence of a catalyst at temperatures in the range of 200° to 400° C., wherein the catalyst comprises at least one phosphorus compound and at least one metal salt, other than a tin(II) salt, said catalyst containing at least 0.025 mol % of said phosphorous compound and at least 0.025 mol % of said metal salt, each relative to the sum of components A and B.

2. A process according to claim 1, wherein the amount of phosphorous compound and metal salt is 0.5 to 4 mol % each relative to A and B.

3. A process according to claim 1, wherein the amount of phosphorous compound and metal salt is 0.2 to 2 mol % each relative to A and B.

4. A process according to claim 1, wherein the phosphorous compound is phenylphosphonic acid.

5. A process according to claim 1, wherein phosphorous compound is an acid of general formula H₃POₘ with m=2 to 4.

6. A process according to claim 1, wherein the metal of the metal salt is from the 1st to 3rd main groups of the periodic table.

7. A process according to claim 1, wherein the metal of the metal salt is lithium, sodium, potassium, magnesium, calcium, barium, aluminum, zinc or iron.

8. A process according to claim 1 wherein the catalyst is a metal salt of a phosphorous-containing acid of general formula H₃POₘ with m=2 to 4.

9. A process according to claim 1, further comprising a cocatalyst.

10. A process according to claim 9, wherein the cocatalyst is dialkyl amino pyridine.

11. A process according to claim 9, wherein the cocatalyst is 0.2 to 2 mol % relative to the sum of components A and B.

* * * * *